April 1, 1969 R. J. GHIRINGHELLI 3,436,477

AUTOMATIC DIALER

Filed Dec. 30, 1965

Sheet 1 of 2

INVENTOR:
ROBERT J. GHIRINGHELLI
BY Robert H. Henderson
ATTORNEY

INVENTOR:
ROBERT J. GHIRINGHELLI
BY Robert H. Henderson
ATTORNEY

United States Patent Office 3,436,477
Patented Apr. 1, 1969

3,436,477
AUTOMATIC DIALER
Robert J. Ghiringhelli, Richmond Hill, N.Y., assignor to The Western Union Telegraph Company, New York, N.Y., a corporation of New York
Filed Dec. 30, 1965, Ser. No. 517,545
Int. Cl. H04l *15/34, 15/24*
U.S. Cl. 178—26 9 Claims

ABSTRACT OF THE DISCLOSURE

Code conversion means for converting simultaneous permutation tape code into sequential dial pulse code, includes a binary counter to convert the tape code into binary code potentials; a binary counter stores the potentials as a binary number; a readout means includes a clock pulse generator and a shift register to read out the stored count sequentially. The binary counter comprises a scale of sixteen counter.

This invention relates to the printing telegraph, and more particularly to novel means for enabling such a device to call and be connected to a particular desired receiver, without the need for an operator to perform or supervise the process, and without any need for human intervention in the operation.

The printing telegraph circuits generically known as Telex have been used throughout the world for many years, but it always heretofore has been necessary for the subscriber to establish his own connection with the desired destination page printer by dialing a specific destination code for the particuar receiver desired. This is done by means of the ordinary circular dial-pulse-producing switch common to telephones, but it requires the immediate personal attention of the subscriber in order to effect the desired result.

This has been inconvenient in some cases because of the fact that it has now become common for such messages to be encoded in punched paper tape and transmitted en bloc at high speed in order to minimize the transmission time, and thereby the cost of use of the lines and connecting equipment.

Heretofore, however, the dialing of the destination code has not been capable of accommodation except manually, since there was no manner in which the ten digit sequential dial code pulse train could be encoded from the five level simultaneous code of the telegraph storage tape.

By means of the present invention it becomes possible to translate dialing information from the five level Baudot code into the necessary dial pulse code so that dialing of a desired destination can be accomplished automatically, and a block of messages consigned to several destinations can be run off automatically at a given time, or upon receipt of a given signal, without need for the attention of an operator, or the necessity for hand-dialing the number of any of the recipients.

It is therefore one of the objects of the invention to provide means for the automatic transmission of destination code dialing pulses in the decimal system from tapes prepared in the Baudot telegraph code.

It is another object of the instant invention to provide in such means, a facility for determination of whether a correct connection has been effected at the conclusion of such transmission, and if not, to cause a repetition of such transmission in order to effect a correct connection.

Another object of the invention, is to accomplish the aforementioned objects by the use of solid state circuitry which is substantially non-deteriorating, and which is small enough to fit inside the telegraph printer console.

A further object is to provide in a communication system an automatic destination code dialing facility employing solid state unit modules to facilitate manufacture, simplify servicing and reduce the cost of assembly.

These and other objects of the invention which will become apparent as the following detailed description is read, I achieve by means of several functional devices cooperating in the following manner.

A tape transmitter senses code holes in a prepared tape by means of sensing pins which actuate switches to provide circuit closures at the five simultaneous code levels of the tape. Such closures are normally serialized by a distributor and applied to the telegraph line in the Baudot code. In the case of a destination code number however, and upon receipt of a characteristic signal they are routed to a buffer storage unit. This consists of an encoder comprising an appropriate number of electronic flip-flops of well known kind, together with suitable ancillary equipment to provide a simultaneous set of output wire conditions (energized or deenergized) unique to the received number, which are stored by the switch closures caused by the sensing pins, during a predetermined cycle of operation.

Identification of the characteristic signal (FIGS, a single character, is the one actually used) is accomplished by a decoder consisting of a multiplicity of logical "and" gates arranged in the customary manner to provide a unique output upon receipt of such specific signal. The sending distributor is thereupon inactivated and the encoder caused to translate the subsequently received five level Baudot numbers of the punched tape into a four level simultaneous code to the base ten, which is convertible upon serialization into conventional dial pulse impulses. This encoder comprises a similar but differently connected group of logic elements as the decoder, arranged to provide four wire energization of a dial pulse generator which has a shift register for storage of successive numbers in the four level code, and clock pulse readout means for serializing the output into conventional dial pulses.

A clearer understanding of the invention may be had from the following more detailed description thereof taken in conjunction with the drawings of a specific illustrative example of the invention wherein like numbers refer to the same part in each figure and wherein.

Figures 1, 3:
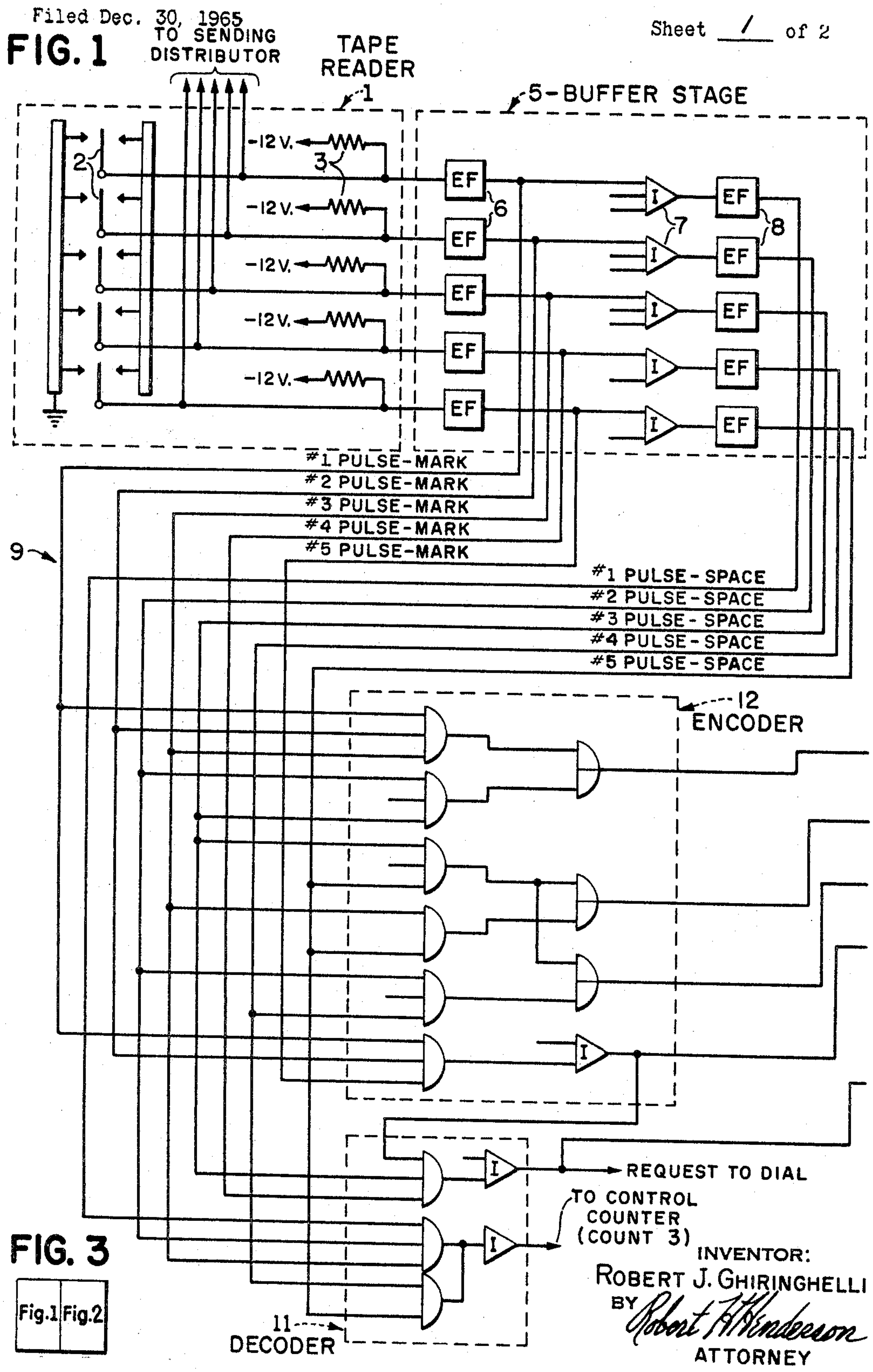
FIG. 1 is a schematic drawing of a portion of the instant invention.
FIG. 3 is a diagram showing the manner of juxtaposition of FIG. 1 and FIG. 2.
Figure 2:
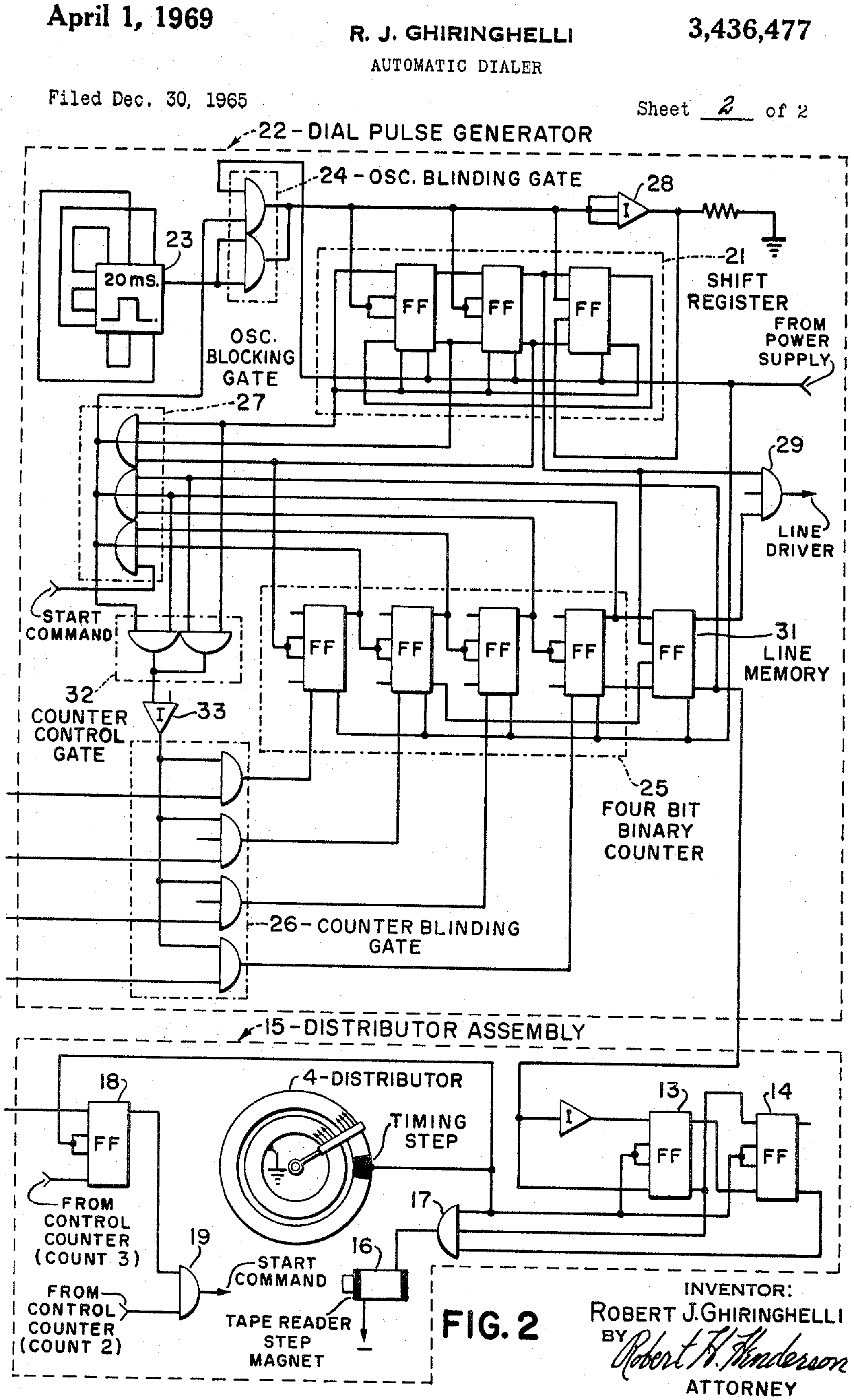
FIG. 2 is a continuation of FIG. 1.

Turning now to the drawings, there is seen in FIG. 1 a tape reader 1 of the customary kind, wherein five switches such as 2 are arranged to be individually activated by sensing pins (not shown) under control of a paper tape pre-punched in the five level code. Each such switch 2 is energized at −12 volts DC through a resistor such as 3 from a power supply (not shown) to indicate "space" unless grounded by operation of its appropriate sensing pin upon encountering a tape hole as the tape is drawn across the pins, to indicate "mark." Each such switch 2 is shown to be connected to a wire leading to a sending-distributor 4 for serialization of the simultaneous five level potentials into the start-stop Baudot code in the usual manner.

Said wires also are shown to enter a buffer stage 5 and through indivdiually isolating emitter followers such as 6, provide code potentials to the inverters such as 7 which, after further isolation by emitter followers such as 8, supply, when so triggered, an output of "space" potentials at each of five levels, corresponding to the alternative "mark" potentials occurring immediately beyond emitter followers 6.

All such ten code wires as are indicated by the numeral 9 thus provide a set or a reset potential for each of the five levels of the scanner tape, and are led to the inputs of the decoder 11 and the encoder 12.

It should be understood that the logic circuits heretofore mentioned and about to be described are constructed by the interconnection of elementary modules of the type widely recognized in the art and known as "transistor resistor logic" modules although any of the several well known other types could be used, if their particular advantage of speed, size, etc., were desired.

Decoder 11 comprises "and" gates arranged to produce an output through an inverter upon the occurrence of pulses 1, 2, 4, 5 "mark" and 3 "space," this being the code for "Figs." and the indication that a destination code pattern of dial numbers is forthcoming. Such output effects the placement of a "request to dial" signal on the telegraph line to the central office in the usual manner by actuating equipment not shown to modify the terminating impedance of the line so that line current changes from five to fifty milliamperes and if acceded to by the central office as shown by an appropriate "go ahead" signal returned from the central office to the transmitter and comprising a timed circuit interruption, actuates flip-flops 13 and 14 of distributor assembly 15 to step the tape in the tape reader to the first numeral, by energizing step magnet 16 through a coincidence, within the "and" gate 17, of signals from said flip-flops 13 and 14, and the timing step from distributor 4.

The "request to dial" signal having also provided a step or pedestal input which persists on the flip-flop 18, the next step pulse from the distributor 4 coinciding with the third count from the control counter sets the flip-flop providing output to the starting gate 19, an "and" gate, which further produces a "start command" output.

The control counter above referred to is not shown on the drawing, since it is of simple and conventional digital design. It is a standard shift register of usual kind used to keep track of key events in the operations sequence, and is located apart from the instant equipment. It is stepped by inputs from the decoder 11 as later explained and by the "go ahead" signal returned from the central office. Its outputs comprise the "request to dial" signal applied to the line on count 1, an input to starting gate 19 on count 2, and a reset signal on count 3 for flip-flop 18 and shift register 21 as later explained.

A free running multivibrator oscillator 23 producing pulses having a 20 millisecond repetition rate feeds an oscillator blinding gate 24 which is an "and" gate. To pass clock pulses, an input from the oscillator blocking gate 27 is required, as well as an input from any flip-flop of the shift register 21 or the register 25 which contains a digit. The oscillator blocking gate being an "or" gate having the "start command" as one of its inputs, and the register 25 carrying at the time the digits from the gates 26, clock pulses thus are applied to shift register 21, which is seen to be so connected in its last flip-flop and through the inverter 28 that after the fifth clock pulse, the register resets. The output gate 29 is an "and" gate having an input connected to the "set" connection between the second and third flip-flops of shift register 21, and thus will be energized through counts 2, 3, and 4 and deenergized during counts 1 and 5. A sixty millisecond space duration and forty millisecond mark duration is thereby established as the standard dial pulse output from shift register 21.

The shift register 21 thus provides pulses of dial pulse length to the output gate 29 for so long as the starting gate 27 causes it to be provided with clock pulses.

In addition to opening the oscillator blinding gate as above described, the start command pulse also traverses the counter control gate 32, is inverted in inverter 33 and opens counter blinding gate 26 to apply the code potentials of the tape digit being read as a probe to the four flip-flops of the binary counter 25.

Line memory flip-flop 31 is set by the second count of shift register 21 and thereafter holds output gate 29 open regardless of the condition of the shift register until the second and fourth flip-flops of the binary counter 25 go to reset, i.e., after completion of the count of the binary counter.

The code potentials of the tape digit are applied to counter 25 in such a way as to cause its flip-flops to be reset so as to cause the desired numerical number of counts to occur at the conclusion of a ten count period, and then by providing a reset signal from the second flip-flop of counter 25 to the line memory flip-flop 31, blinds the output gate 29 to further output pulses. The counter 25, however, continues to count, under the influence of the continuing operation of shift register 21, to the completion of its count of sixteen, one hundred millisecond per count, providing an interdigital mark signal of 600 milliseconds as required for the decimal code output.

During this interdigital interval the tape is stepped to the next code character, but counter blinding gate 26 remains closed to the consequent code potentials until shift register 21 has all of its flip-flops reset and counter 25 has all of its flip-flops set, and line memory flip-flop 31 is reset. When these conditions obtain, the counters and controls are in the initial condition first described, and upon receipt of a step pulse from distributor 4, will read out the next dial pulse digit through the output gate 29 in the manner just fully described.

This cycling continues until all the tape code characters which are dial pulse numbers have been transmitted onto the telegraph line, at which point the function character SP is encountered in the tape. An "and" gate and an inverter of the decoder 11 being connected to detect this concurrence of Baudot code potentials on the 1, 2, 4, 5 space and 3 mark wires from the buffer storage unit 5, an output pulse is sent to the control counter (not shown) stepping it to count 3, if the line potential unique to an established connection is there present. A pulse returned by the control counter then resets flip-flop 18 to blind the starting gate 19 and inhibit further passage of any "start command" pulse to the counter starting gate 27.

The line memory flip-flop 31 having been reset, flip-flop 13 is pedestalled thereby and driven to reset by the next distributor step pulse, placing a pedestal on flip-flop 14 for locking it on set at the next following step pulse. Gate 17 is thereby blinded and the entire mechanism rendered inoperative to step the tape, which is thereupon returned to control of the mechanical tape reader for message transmission in the conventional manner.

It will be realized that it is of primary importance that the tape reader should take but a single step during the interdigital period, although the distributor produces four step pulses during this time. This is insured by the line memory flip-flop 31 providing on reset a pedestal to binary 13 for locking it on reset, when pulsed, and through an inverter, for locking it on set when pulsed in the absence of such pedestal (when flip-flop 31 is operating and set). The movement of flip-flop 13 to set in consequence of a distributor step pulse, pedestals flip-flop 14 to reset, whereupon the next step pulse resets it to energize gate 17 for passage of one step pulse to the step magnet 16, thus advancing the tape one step.

It is a feature of this invention that a failure of the equipment to establish connection on the first attempt is followed after a timed delay, by further attempts to establish a connection.

This is accomplished by preparing the tape with a plurality of successive identical addresses therein. The reading of the character "SP" at the termination of the first dialing effort then causes the tape reader 1 to step past all further dial code numbers by moving the control counter to count three, and effects shutdown of the described equipment if the dialing was successful, as indicated by receipt of a "call connect" signal comprising a steady mark condition on the line. If such a signal is not received however, the dialing attempt is re-initiated by the reading of the next prepared address, and so forth, until the number of separate addresses supplied has been exhausted.

What is claimed is:

1. Code conversion means for a printing telegraph system having at least one transmitter arranged for operation from a tape prepared in characters of a simultaneous permutation code, a plurality of receiving printers for interconnection therewith, and a central office having means to switch said interconnection between said transmitter and said printers respectively in accordance with decimal digital pulse signal commands from said transmitter; said code conversion means comprising means to covert a tape code representing numbers into a set of binary code potentials, a plurality of flip-flops interconnected to form a binary counter and connected to store said code potentials as a binary number, and readout means for the counter comprising a clock pulse generator and a shift register connected thereto for producing alternating mark and space potentials at a dialing pulse rate, connected to said binary counter and controlled thereby to read out the stored count of dialing pulses.

2. Code conversion means for a printing telegraph system having at least one transmitter arranged for operation from a tape prepared in characters of a simultaneous permutation code, a plurality of receiving printers for interconnection therewith, and a central office having means to switch said interconnection between said transmitter and said printers respectively in accordance with decimal digital pulse signal commands from said transmitter; said code conversion means comprising means to read the tape code, means to convert the reading into a simultaneous set of permutation code electrical potentials, means comprising logical "and" gates to convert said potentials into a simultaneous set of binary digital potentials, means comprising a plurality of binary counter elements connected together and to said "and" gates for binary number storage, and clock means having regularly alternating mark and space potentials connected to the said counter elements and controlled thereby and by the potential of the telegraph line for issuing one said mark and one said space potential for each decimal digit of the binary number stored in the counter.

3. The code conversion means of claim 1, wherein the said binary counter comprises a scale of sixteen counter connected to cycle completely through sixteen counts upon the reading out of any decimal dialing digit, and an output gate connected to the counter for blinding the output after the reading out of such digit and during an interdigital time comprising the remainder of the said count of sixteen.

4. The code conversion means of claim 2, wherein the said binary counter comprises a scale of sixteen counter connected to cycle completely through sixteen counts upon the reading out of any decimal dialing digit, and an output gate connected to the counter for blinding the output after the reading out of such digit and during an interdigital time comprising the remainder of the said count of sixteen.

5. The code conversion means of claim 1, wherein there is included means responsive to the reading of a predetermined function signal in the tape simultaneously with the occurrence of a line potential indicative of receiver connection thereto, for rapidly stepping the tape past all further consecutive dialing numbers in the tape.

6. The code conversion means of claim 2, wherein there is included means responsive to the reading of a predetermined function signal in the tape simultaneously with the occurrence of a line potential indicative of receiver connection thereto, for rapidly stepping the tape past all further consecutive dialing numbers in the tape.

7. The code conversion means of claim 1, wherein the said binary counter comprises a scale of sixteen counter connected to cycle completely through sixteen counts upon the reading out of any decimal dialing digit, and an output gate connected to the counter for blinding the output after the reading out of such digit and during an interdigital time comprising the remainder of the said count of sixteen, and wherein there is included means responsive to the reading of a predetermined function signal in the tape simultaneously with the occurrence of a line potential indicative of receiver connection thereto, for rapidly stepping the tape past all further consecutive dialing numbers in the tape.

8. The code conversion means of claim 2, wherein the said binary counter comprises a scale of sixteen counter connected to cycle completely through sixteen counts upon the reading out of any decimal dialing digit, and an output gate connected to the counter for blinding the output after the reading out of such digit and during an interdigital time comprising the remainder of the said count of sixteen, and wherein there is included means responsive to the reading of a predetermined function signal in the tape simultaneously with the occurrence of a line potential indicative of receiver connection thereto, for rapidly stepping the tape past all further consecutive dialing numbers in the tape.

9. Code conversion means to convert Baudot code in a prepared tape to dial pulse code, comprising a shift register driven in a periodic cycle of forty milliseconds mark and sixty milliseconds space, a count of sixteen binary counter preset to a decimal digit count decoded from the tape and stored in the counts immediately preceding the tenth count, means responsive to a go ahead potential for causing the binary counter to be back stepped one step by each cycle of the shift register for reading out the stored count in marks and spaces, and means to further step the binary counter for the remainder of sixteen counts without such readout.

References Cited

UNITED STATES PATENTS

| | | |
|---|---|---|
| 2,678,965 | 5/1954 | Ziffer et al. |
| 2,982,818 | 5/1961 | Kendall. |
| 3,038,030 | 6/1962 | Murray. |
| 3,301,957 | 1/1967 | Germond et al. |

THOMAS A. ROBINSON, *Primary Examiner.*

U.S. Cl. X.R.

178—3, 17.5; 179—3; 340—347